United States Patent [19]

Ina

[11] Patent Number: 4,533,103
[45] Date of Patent: Aug. 6, 1985

[54] DEVICE IN UNIVERSAL HEAD FOR TILTING CAMERA TO THE LEFT AND RIGHT

[76] Inventor: Tatsuo Ina, 22-11 Sendagi 1-chome, Bunkyo-ku, Tokyo, Japan, 112

[21] Appl. No.: 356,388

[22] Filed: Mar. 9, 1982

[51] Int. Cl.³ .............................................. F16M 11/12
[52] U.S. Cl. ...................................... 248/179; 248/180
[58] Field of Search ................ 248/179, 183, 188.2, 248/664, 133, 142, 180, 184; 403/86; 108/7

[56] References Cited

U.S. PATENT DOCUMENTS

| | | | |
|---|---|---|---|
| 212,405 | 2/1879 | Saegmuller | 248/180 |
| 672,303 | 4/1901 | Williams | 248/652 |
| 1,182,881 | 5/1916 | Frye | 248/180 |
| 2,035,733 | 3/1936 | Wall | 248/667 |
| 2,726,834 | 12/1955 | Hoge | 248/180 |
| 3,018,992 | 1/1962 | Lore | 248/180 |
| 3,364,810 | 1/1968 | Hickerson | 248/180 |

FOREIGN PATENT DOCUMENTS 13876 of 1910 United Kingdom ................ 248/180

Primary Examiner—Ramon S. Britts
Assistant Examiner—Sarah A. Lechok
Attorney, Agent, or Firm—George B. Oujevolk

[57] ABSTRACT

The invention relates to a device in a universal head for rocking a camera attached to a tripod. The device includes a table attached to the upper end of the tripod and provided with a central boss protruding upright therefrom, and a rotary sleeve mounted on the table for rotation in the horizontal directions and in such a manner as to be rocked to the left and right. As the rotary sleeve is rotated to the left and right, the position of contact point between the cam portion and the cam receiving member is changed to rock the camera to the left and right together with the tilt bed.

8 Claims, 9 Drawing Figures

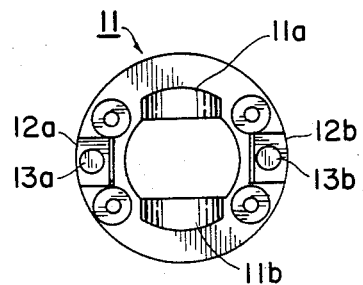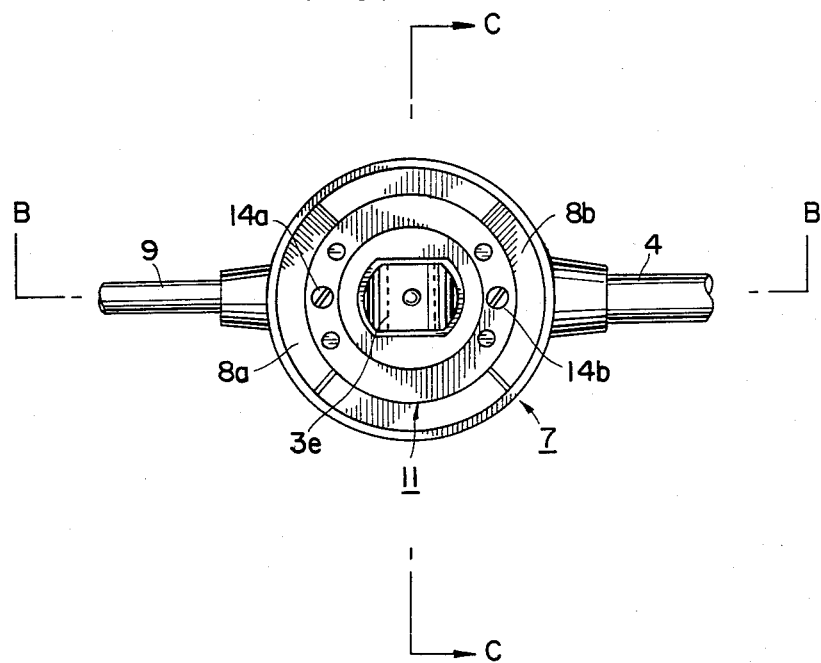

DEVICE IN UNIVERSAL HEAD FOR TILTING CAMERA TO THE LEFT AND RIGHT

BACKGROUND OF THE INVENTION

The present invention relates to a device for tilting a universal head for supporting a camera in the left and right directions.

Such a universal head for camera has been known as adapted to tilt the camera in the forward and backward direction. However, no universal head has been proposed adapted to tilt the camera in the left and right directions. In taking photograph using a tripod, the ground surface on which the tripod stands is not always horizontal, and it has been often found that the camera supported by the tripod is declined in the left and right directions because of the inclination of the ground surface. In such a case, it is necessary to take the trouble of adjusting the length of the legs of the tripod to keep the camera in the upright position.

In some cases, it is necessary to intentionally incline the camera in the left or right direction depending on the kind of object to be shot. This also requires the troublesome work of adjusting the lengths of the legs of the tripod.

SUMMARY OF THE INVENTION

Accordingly, an object of the invention is to provide a universal head for camera, capable of tilting the camera in the left and right directions by a simple operation.

The above and other objects, features and advantages of the invention will become clear from the following description of the preferred embodiment taken in conjunction with the accompanying drawings.

BRIEF DESCRIPTION OF THE DRAWINGS

FIG. 4b is a sectional view taken along the line A—A of FIG. 4a;

FIG. 5 is a bottom plan view of a tilt bed;

FIG. 6 is a plan view of the unversal head;

DESCRIPTION OF THE PREFERRED EMBODIMENT

Figure 1:
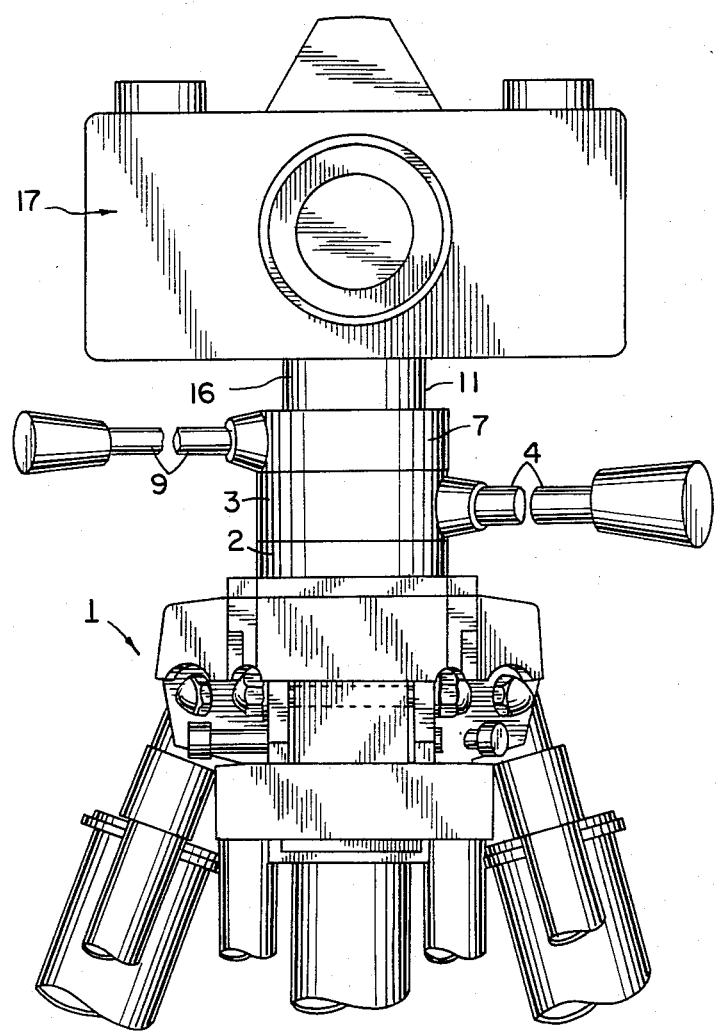
FIG. 1 is a front elevational view of a rocking device in accordance with an embodiment of the invention.
Figure 2:
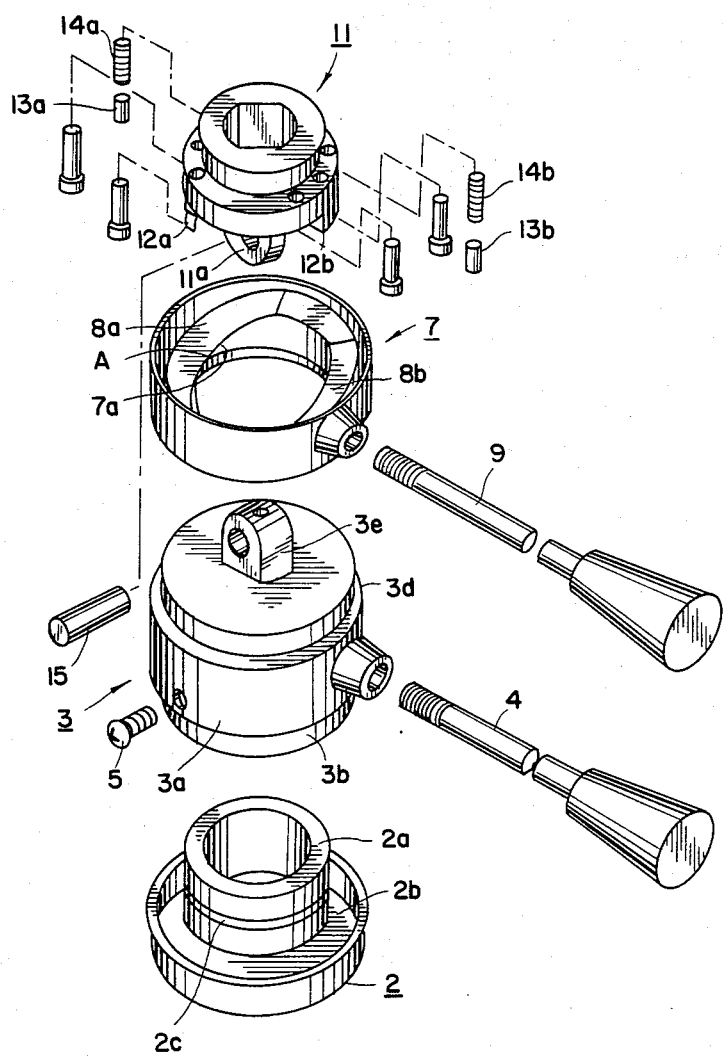
FIG. 2 is an exploded perspective view of a rocking device embodying the present invention.
Figure 3:
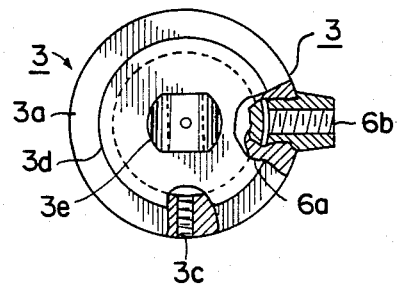
FIG. 3 is a partly-sectioned plan view of a rotary table.
Figure 4A:
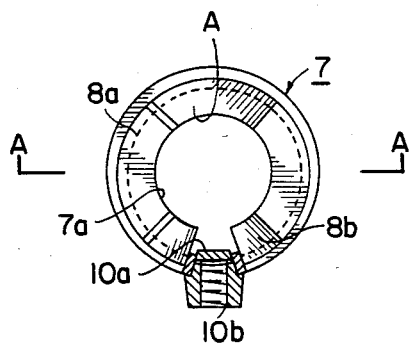
FIG. 4a is a partly-sectioned plan view of a rotary sleeve.
Figure 4B:
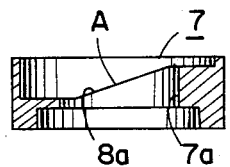
Figure 7:
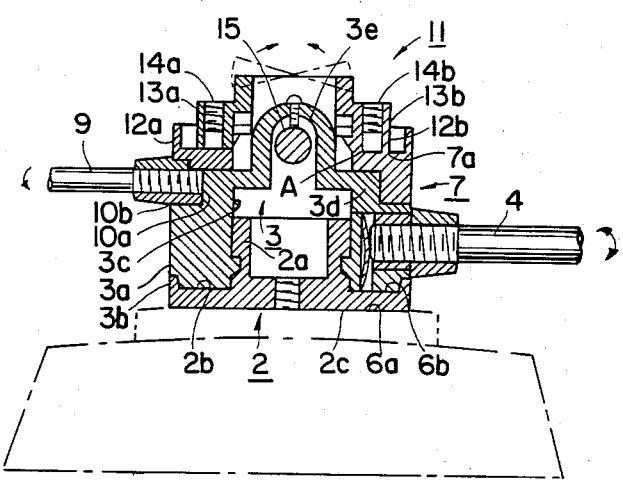
FIG. 7 is a sectional view taken along the line B—B of FIG. 6.
Figure 8:
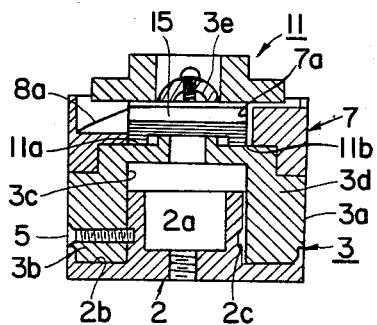
FIG. 8 is a sectional view taken along the line C—C of FIG. 6.

A preferred embodiment of the invention will be described hereinunder with reference to the accompanying drawings. A universal head of the invention has a base plate 2 attached to the upper end of a tripod 1. A boss 2a is formed on the base plate 2 to project therefrom. An annular groove 2b is formed in the axial direction around the boss 2a. An engaging circumferential groove 2c is formed in the peripheral surface of the base portion of the boss 2a. A rotary table rotatably fits around and in the boss 2a and the annular groove 2b of the base plate 2. The rotary table 3 has a barrel portion 3a having a diameter substantially equal to the diameter of the base plate 2 and a skirt portion 3b depending from the barrel portion 3a to fit in the annular groove 2b. A bore 3c closed at one end is formed in the center of the skirt portion 3b so as to extend in the axial direction. The rotary plate 3 is further provided with a neck portion connected to the upperend of the barrel portion 3a and having a diameter slightly smaller than that of the latter and a mounting boss 3e formed on the neck portion 3d coaxially therewith.

A handle 4 for rotating the universal head and a stopper screw 5 are screwed into the barrel portion 3a. More specifically, the stopper screw 5 is screwed into a bore formed in the barrel portion 3a to project into the closed bore 3c into engagement with the peripheral groove 2c thereby to prevent the rotary table 3 from coming off from the base plate 2. A spacer 6a and a leaf spring 6b are installed in the portion into which the handle 4 is inserted.

A hollow rotary sleeve 7 is attached to the neck 3d of the rotary table 3. Cam portions 8a,8b are provided in a shelf-like form in the rotary table 7. A handle 9 for rotary operation is altached to the outer wall of the rotary sleeve with a spacer 10a and a leaf spring 10b attached to the end thereof.

A tilt bed 11 is inserted into the bore of the rotary sleeve 7 from the upper end thereof. A pair of mounting members 11a,11b projecting from the lower surface of the tilt bed 11 are connected to the mounting boss 3e of the rotary table 3, through a bore 7a formed in the rotary sleeve 7, in such a manner as to be able to tilt to the left and right by means of a pin 15. A pair of cam receiving members 12a,12b extended downwardly from the periphery of the tilt bed 11 and having tapered end surfaces are held in contact with the cam portions 8a,8b in the rotary sleeve 7.

Adjust pins 13a,13b made of a plastic, for achieving a smooth sliding motion while eliminating any play, are fitted in the cam receiving members 12a,12b and are pressed from the upper side by means of screws 14a,14b, whereby the forward and backward movement can be adjusted freely.

The arrangement is such that the axis of the pin 15 coincides with the centers of the cam portions 12a,12b.

The operation and advantages of this embodiment will be described hereinunder.

When the tilt bed 11 takes a horizontal position as illustrated, the cam receiving members 12a,12b take the central positions of the cam portions 8a,8b. Then, as the handle 9 on the rotary sleeve 7 is loosened and rotated to the left or right, the position of the contact between one of the cam portions 8a,8b with the corresponding cam receiving member 12a or 12b is raised while the position of the contact between the other of the cam portions with the corresponding cam receiving portion is lowered, so that the tilt bed 11 is tilted to the left or right around the pin 15 acting as a fulcrum.

In use, a camera mount is attached to the tilt bed 11 and a camera 17 is mounted on this camera mount 16. Thus, it is possible to correct the inclination of the camera 17 attributable to the inclination of the tripod, by quite a simple operation as explained above, or to intentionally tilt the camera to the left or right. After setting the camera in the upright posture or at the desired tilting position, the handle 9 attached to the rotary sleeve 7 is tightened so that the rotary sleeve 7 is fixed to the rotary bed 3 through the spacer 10a and the leaf spring 10b.

The maximum allowable tilting angle of the tilt bed 11 is selected as desired by suitably determining the angle of inclination of the cam portions 8a,8b. It is considered that a maximum allowable tilting angle of 45° in each of the left and right directions is enough.

The cam portions 8a,8b may be formed in symmetry as in the illustrated embodiment. This, however, is not exclusive and the cam portions may be formed at an inclination or taper in one direction as if the rotary sleeve is cut axially obliquely, so as to cooperate with one or two portions corresponding to the cam receiving portion. It is also possible to form the cam receiving portion in the form of the sleeve cut in the axial direction obliquely.

For rotating the camera 17 in the horizontal direction, the handle 4 on the rotary table 3 is loosened to permit the rotary table 3 to rotate freely 360°. Thus, the rotary table 3 is rotated by hand gripping the handle 4 and is tightened as the rotary table 3 has been rotated to the desired position.

By superposing this universal head to another universal head constructed to permit the swinging in the forward and backward directions, it is possible to rock and rotate the camera forwardly and backwardly and to the left and right, and in the horizontal plane. Needlss to say, such a feature is quite helpful and convenient for the photographers. It is of course possible to use this structure as a universal head having an elevation. To this end, a mounting screw is provided on the camera mount 16 and the base portion of another universal head, adapted to swing in the forward and backward directions, is attached by means of the mounting screw. Alternatively, the universal head of the invention is attached to another universal joint having a swinging function in the forward and backward directions. The latter arrangement is preferred when the universal head of the invention is used as a universal head with elevation.

In the universal head of the invention, the expected result can be obtained even if the base plate 1 is substituted by the rotary table 3. In the attached claims, therefore, the term "table" is used to mean one or both of the rotary table 3 and the base plate 1.

What is claimed is:

1. A device for use in a universal head for a camera and adapted to tilt the camera in the lateral directions, said device comprising in combination:
   (a) a tripod with legs, said legs having an upper portion, a table base plate (2) mounted on said upper portion, with a boss (2a) protruding from the center thereof, a rotary table (3), mounted on said boss (2a) said rotary table (3) having an upper neck (3d);
   (b) a hollow rotary sleeve means (7) mounted on said neck (3d) with tapered cam portions (8a, 8b), said hollow rotary sleeve means (7) being mounted on said rotary table (3) for rotation in the horizontal plane;
   (c) a tilt bed (11) attached to said boss (2a) cooperating with said rotary table (3) in clamping said hollow rotary sleeve means (7) therebetween, said tilt bed (11) being provided with cam receiving portions (12a, 12b) projecting downwardly therefrom and adapted to contact said cam portions (8a, 8b), so that a camera that is attached to said tilt bed (11) is tilted in one or the other lateral directions together with said tilt bed (11) as said rotary sleeve means (7) is rotated; and,
   (d) handle means operatively coupled to said device to rotate said sleeve means.

2. A device as claimed in claim 1 wherein said base plate (2) has an annular groove (2b) around said boss (2a), and an engaging circumferential groove (2c), said rotating table (3) having a barrel portion (3a) with a skirt portion (3b), said barrel portion (3a) fitting into said annular groove (2b) and supported by said engaging circumferential groove (2c), and, handle receiving means in said rotary table barrel portion (3a), said handle being mounted to said handle receiving means, with a spacer (6) and a leaf spring (6b) mounted in said handle receiving means.

3. A device as claimed in claim 2 including a second handle (9) with a second spacer (10) and a second leaf spring (10b) attached to said rotary sleeve (7), said tilt bed (11) being inserted in the hollow portion of said hollow rotary sleeve means (7), a mounting boss (3e) on said rotary table (3), said tilt bed (11) having a mounting lug (11a) extending through said rotary sleeve (7), and, a pin (15) connecting said mounting lug (11a) to said mounting boss (3e) to enable said tilt bed to tilt.

4. A device for use in a universal head for camera and adapted to tilt the camera in the left and right directions, said device comprises:
   a base plate (2) mounted on a tripod (1) and having a boss (2a) protruded from the center thereof; a rotary table (3) rotatably attached in a horizontal direction to said boss (2a) and having a mounting boss(3e) protruded from the center thereof;
   a tilt bed (11) rockably having a pair of mounting members (11a, 11b) and a pair of cam receiving members (12a, 12b), said mounting members (11a, 11b) and cam receiving members are projected downwardly therefrom, said mounting members (11a, 11b) are tiltable connected in a vertical direction to said mounting boss (3e) via a pin (15); and a rotary sleeve (7) rotatably mounted in a horizontal direction between said rotary table (3) and said tilt bed (11), said rotary sleeve (7) having a pair of tapered cam portions each of which is contacted with said cam receiving members (12a, 12b); whereby a camera attached to said tilt bed (11) is rotated in a horiontal direction with said rotary table (3) via a handle (4) and tilted in a vertical direction when said rotary sleeve is rotated in a horizontal direction via a handle (9).

5. A device as claimed in claim 4, wherein said rotary table (3) is formed with said tripod (1) in one body.

6. A device as claimed in claim 4, wherein said rotary table (3) having a stopper screw (5) is engaged with a peripheral groove (2c) formed said boss (2a) for preventing said rotary table (3) from coming off from the base plate (2).

7. A device as claimed in claim 4, wherein said handle (4) is screwed to a barrel portion (3a) of said rotary table (3), a spacer (6a) and a leaf spring (6b) are inserted between said boss (2a) and one end of a screwed side portion of said handle (4) for preventing the rotation of said rotary table (3).

8. A device as claimed in claim 4, wherein said cam receiving portion contacting said cam portion of said tilt bed is provided with adjusting means for absorbing the play of said tilt bed.

* * * * *